(12) United States Patent
Friend et al.

(10) Patent No.: US 9,790,695 B1
(45) Date of Patent: Oct. 17, 2017

(54) OPERATION RESUME FUNCTIONS FOR IMPLEMENT CONTROL SYSTEMS AND METHODS UTILIZING RELATIVE POSITIONING

(71) Applicant: Caterpillar Inc., Peoria, IL (US)

(72) Inventors: Paul Friend, Mortion, IL (US); Qi Chen, Dunlap, IL (US); Jean-Jacques Clar, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/366,787

(22) Filed: Dec. 1, 2016

Related U.S. Application Data

(63) Continuation-in-part of application No. 15/258,366, filed on Sep. 7, 2016.

(51) Int. Cl.
*E04G 21/04* (2006.01)
*B33Y 10/00* (2015.01)
*B33Y 30/00* (2015.01)
*B33Y 50/02* (2015.01)

(52) U.S. Cl.
CPC .......... *E04G 21/0463* (2013.01); *B33Y 10/00* (2014.12); *B33Y 30/00* (2014.12); *B33Y 50/02* (2014.12)

(58) Field of Classification Search
CPC ..... E04G 21/0463; B33Y 10/00; B33Y 30/00; B33Y 50/02
See application file for complete search history.

(56) References Cited

U.S. PATENT DOCUMENTS

| 8,644,964 B2 | 2/2014 | Hendron et al. |
| 2016/0222630 A1* | 8/2016 | Friend ..................... E02F 3/437 |

* cited by examiner

*Primary Examiner* — Basil T Jos
(74) *Attorney, Agent, or Firm* — Miller, Matthias & Hull LLP

(57) ABSTRACT

A control system for controlling operation of an implement based, at least, on a pre-determined implement control plan, includes a relative positioning system, a controller, and one or more actuators. The relative positioning system is configured for determining positioning of the and utilize input from perception sensors to determine relative positioning signals. The controller is configured to determine a resume position for a next operation of the implement based on the predetermined implement control plan and at least one of the relative positioning signals and an end position of a previous operation of the implement. The controller may further be configured to determine implement control signals based on, at least, the resume position. The one or more actuators are each operatively associated with one or both of the implement and machine and configured to receive the implement control signals and position the implement based on the implement control signals.

20 Claims, 9 Drawing Sheets

OPERATION RESUME FUNCTIONS FOR IMPLEMENT CONTROL SYSTEMS AND METHODS UTILIZING RELATIVE POSITIONING

CROSS-REFERENCE TO RELATED APPLICATION

This patent application is a continuation-in-part, under 35 U.S.C. §120, of U.S. patent application Ser. No. 15/258,366, filed on Sep. 7, 2016.

TECHNICAL FIELD

The present disclosure generally relates to control systems for machines and, more particularly, to operation resume functions implemented within control systems and methods for machines and associated implements, which utilize relative positioning.

BACKGROUND

Work machines, such as excavators and tele-handlers, may be used to control implements in order to perform various functions. Such implements may be utilized for a variety of tasks including, but not limited to, additive construction, loading, compacting, lifting, brushing and may include, for example, additive construction implements, buckets compactors, forked lifting devices, brushes, grapples, cutters, shears, blades, breakers, hammers, augers, and the like.

For controlling implements and their associated machines, various control systems are utilized to manually, autonomously, or semi-autonomously control movement of the work implement in the X, Y, and Z directions. For example, control systems for implements can control orientation of the implement, such as, but not limited to, a roll, a pitch, and/or a yaw of the implement. Such control systems may utilize a controller to receive instructions from various sources (e.g., user controls, a memory, a remote control, etc.) and determine controls to execute via the control system. The control systems send signals to elements associated with the controller, such as motors or actuators, to position the implement in accordance with the determined controls.

In some control systems, a structure of the machine may be utilized by and actuated by the control system to control the position of the implement. These systems may use one or more actuators to control movement of the machine and/or implement while positioning the implement. However, control via such machine-associated components may not provide the desired control accuracy for all types of implements and/or such components may not be configured or configurable for use in accordance with an implement control plan.

Some modern implement control systems, such as the control systems disclosed by U.S. Pat. No. 8,644,964 ("Method and System for Controlling Movement of an End Effector on a Machine"), may employ control schemes that transmit signals movement of a machine to moving elements of the control system (e.g., control of a crane of an excavator) and transmit signals for movement of the machine to other elements of the control system that are more directly associated with the implement, in accordance with an implement control plan. However, such signals do not account for stoppage in the implement control plan, nor are such systems and methods configurable for piecemeal completion of said implement control plan.

Accordingly, such prior known control systems and methods both do not provide for suitable accuracy for control, nor do they account for piecemeal completion, starting and resuming, or other interruptions in implement control plans. Therefore, control systems and methods for controlling an implement that include operation resume functions, by utilizing relative positioning, are desired.

SUMMARY

In accordance with one aspect of the disclosure, a control system for controlling operation of an implement based, at least, on a pre-determined implement control plan is disclosed. The implement is associated with a machine. The control system may include a relative positioning system, a controller, and one or more actuators. The relative positioning system may include one or more perception sensors operatively associated with the implement and configured for determining positioning of the implement relative to a past operation of the implement, the past operation performed as part of the pre-determined implement control plan. The relative positioning system may utilize input from the perception sensors to determine relative positioning signals, the relative positioning signals representative of a position of the implement relative to a worksite. The controller may be configured to determine current progress of the predetermined implement control plan, relative to an actual implement operation performed by the implement, based on the relative positioning signals. The controller may further be configured to determine an end position of the past operation of the implement based on the relative positioning signals. The controller may further be configured to determine a resume position for a next operation of the implement based on the predetermined implement control plan and at least one of the relative positioning signals and the end position. The controller may further be configured to determine implement control signals based on, at least, the resume position. The one or more actuators are each operatively associated with one or both of the implement and machine and configured to receive the implement control signals and position the implement based on the implement control signals.

In accordance with another aspect of the disclosure, a method for controlling an implement of a machine based, at least, on a pre-determined implement control plan stored on a memory of a controller operatively associated with the machine and implement is disclosed. The method may include determining, by a relative positioning system, relative positioning signals based on input of one or more perception sensors of the relative positioning system, the one or more perception sensors being operatively associated with the implement and configured for determining positioning of the implement relative to a past operation of the implement, the relative positioning signals representative of a position of the implement relative to a worksite. The method may further include receiving, by the controller, the relative positioning signals from the relative positioning system and determining, by the controller current progress of the predetermined implement control plan, relative to an actual implement operation performed by the implement, based on the relative positioning signals. The method may further include determining, by the controller, an end position of the past operation of the implement based on one or more of the current progress, the relative positioning signals, and any combinations thereof. The method may further include determining a resume position for a next operation of the implement based on the predetermined implement control plan and one or more of the relative positioning signals, the current progress, the end position, and any combinations thereof and determining implement control signals based on, at least, the resume position.

In accordance with yet another aspect of the disclosure, for controlling operation of an additive construction implement based, at least, on a pre-determined implement control plan of an additive construction control plan for constructing a structure on a worksite is disclosed. The additive construction implement is associated with a machine. The system may include a relative positioning system, a controller, and one or more actuators. The relative positioning system may include one or more perception sensors operatively associated with the additive construction implement and configured for determining positioning of the additive construction implement relative to a past operation of the additive construction implement, the past operation performed as part of the pre-determined implement control plan. The relative positioning system may utilize input from the perception sensors to determine relative positioning signals, the relative positioning signals representative of a position of the additive construction implement relative to a worksite. The controller may be configured to determine current progress of the predetermined implement control plan, relative to an actual additive construction implement operation performed by the additive construction implement, based on the relative positioning signals. The controller may further be configured to determine an end position of the past operation of the additive construction implement based on the relative positioning signals and determine a resume position for a next operation of the additive construction implement based on the predetermined implement control plan and at least one of the relative positioning signals and the end position. The controller may further be configured to determine additive construction implement control signals based on, at least, the resume position. The one or more actuators each may be operatively associated with one or both of the additive construction implement and the machine. The one or more actuators may be configured to receive the additive construction implement control signals and position the additive construction implement based on the additive construction implement control signals.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
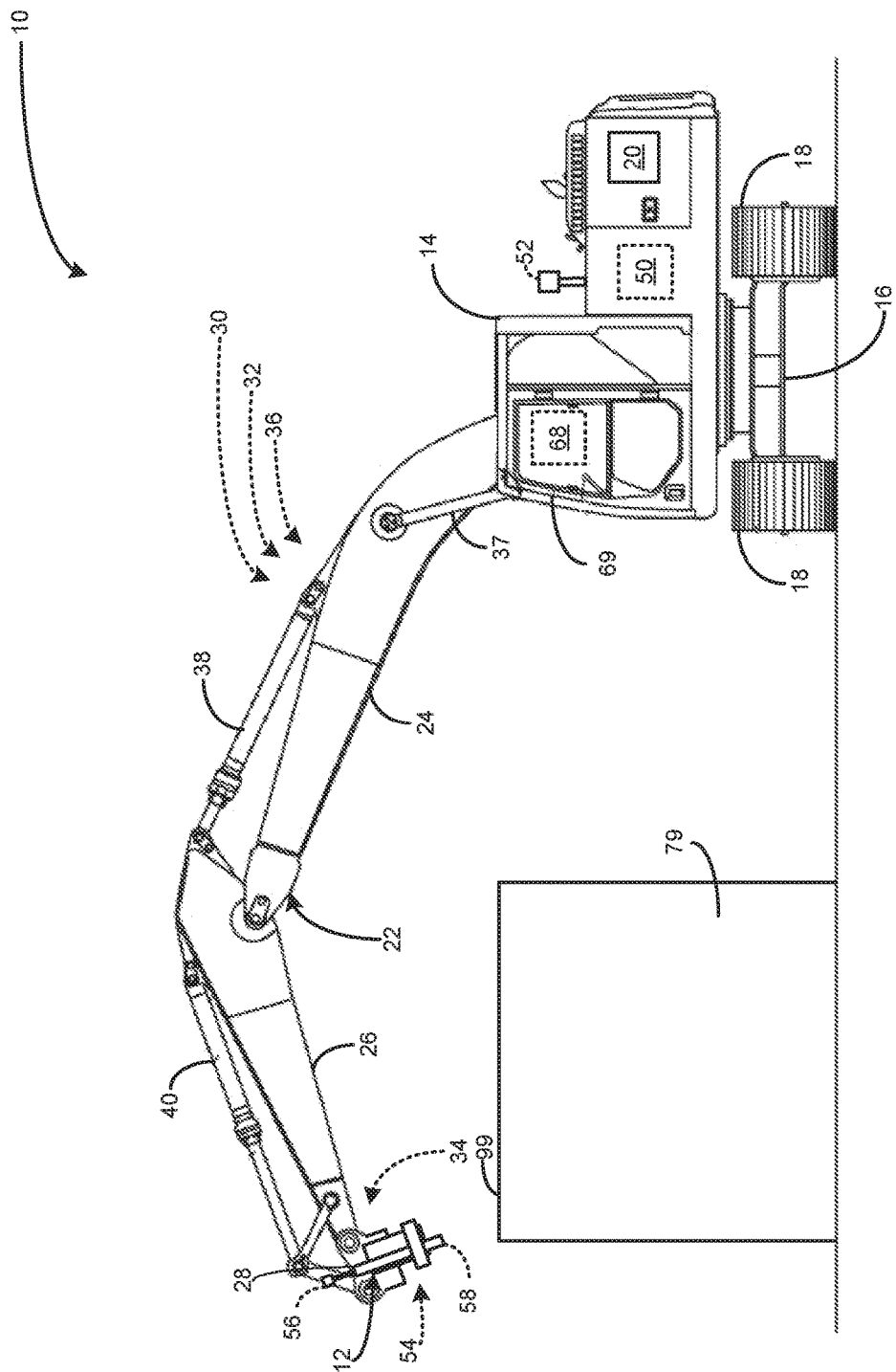
FIG. 1 is a side view of an example implement, an associated machine, and an associated control system, according to an embodiment of the present disclosure.

Turning now to the drawings and with specific reference to FIG. 1, a machine 10 having an implement 12 is illustrated in accordance with the teachings of the present disclosure. While the machine 10 in FIG. 1 is depicted, generally, as an excavator, the teachings of the present disclosure may relate to other work machines that employ control systems for an implement associated with said machine 10. The term "machine" as used herein may refer to any machine that performs some type of operation associated with an industry such as mining, construction, farming, transportation, or any other industry known in the art. For example, the machine 10 may be an earth-moving machine, a wheel loader, an excavator, a gantry machine and/or system, a dump truck, a backhoe, a motor grader, a material handler, or the like. Moreover, the work implement 12 connected to the machine may be utilized for a variety of tasks including, but not limited to, additive construction, loading, compacting, lifting, brushing and may include, for example, additive construction implements, buckets compactors, forked lifting devices, brushes, grapples, cutters, shears, blades, breakers, hammers, augers, and the like.

As depicted in FIG. 1, the machine 10 may include a housing 14 disposed on top of and supported by an undercarriage 16. The undercarriage 16 may be associated with one or more ground engaging devices 18, which may be used for mobility and propulsion of the machine 10. The ground engaging devices 18 are shown as a pair of continuous tracks; however, the ground engaging devices 18 are not limited to being continuous tracks and may additionally or alternatively include other ground engaging devices such as rotatable wheels. A power system 20 is may provide power to the propel or otherwise move the ground engaging devices 18 and may include one or more power sources, such as internal combustion engines, electric motors, fuel cells, batteries, ultra-capacitors, electric generators, and/or any power source which would be known by a person having ordinary skill in the art. Such a power system 20 may further be used to power various motion of the implement 12 or any other elements and control systems associated with the machine 10 and/or implement 12.

For control of the implement 12, the machine may further include a crane 22, which may include a boom 24 operatively coupled with a stick 26. The implement 12 may be attached to the crane 22 at, for example, a distal end 28 of the stick 26. For positioning the implement 12, the crane 22 and, as associated elements, the boom 24 and stick 26, may be controlled by an implement control system 30, which may include a coarse control system 32 and a fine control system 34. The control system 30 is shown in a schematic depiction in FIG. 2.

Figure 2:
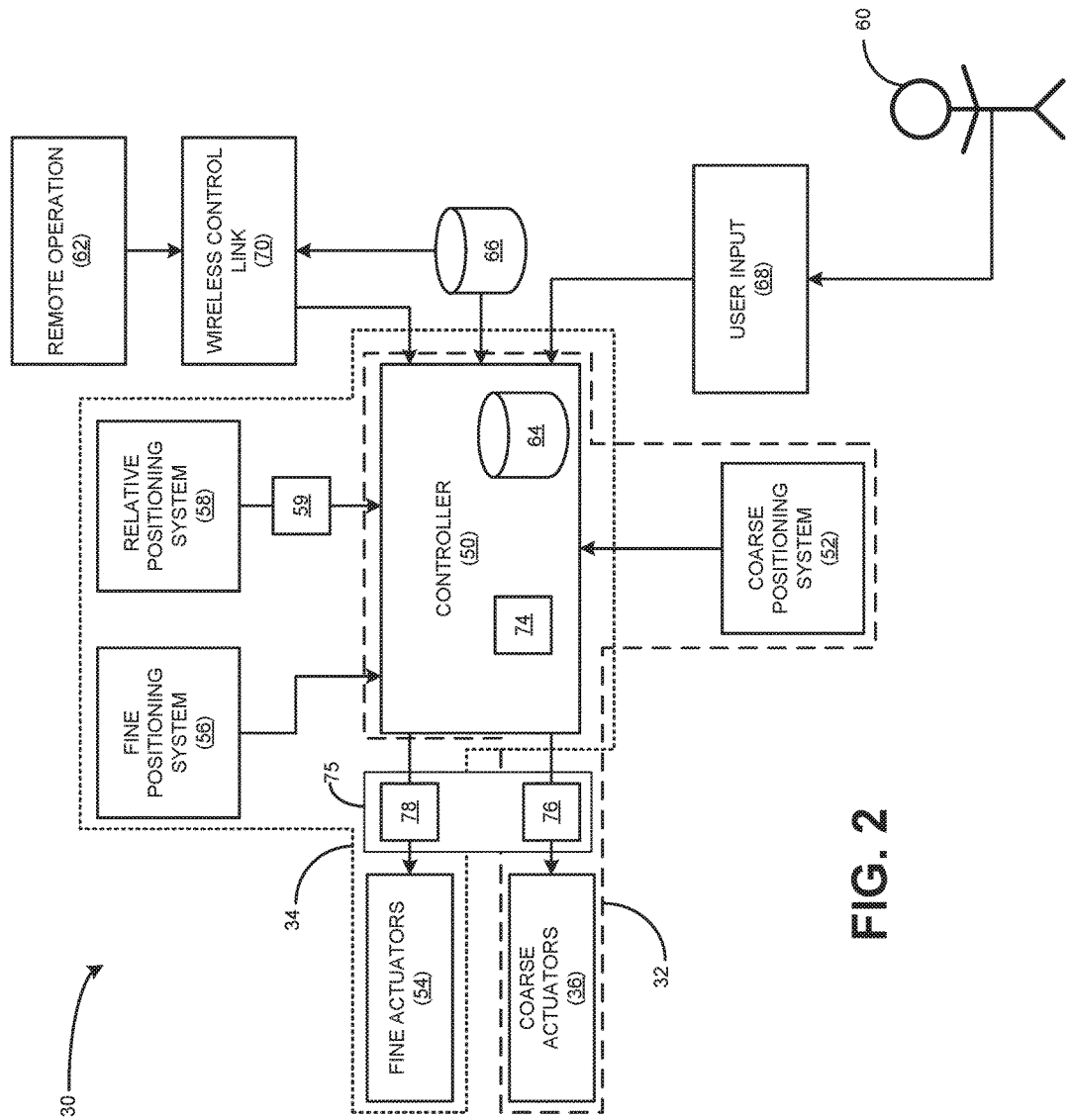
FIG. 2 is a schematic representation of the control system of FIG. 1, in accordance with the present disclosure and the embodiment of FIG. 1.

With reference to both FIGS. 1 and 2, the coarse control system 32 may include a plurality of coarse control actuators 36 for positioning and/or otherwise moving the implement 12. The plurality of coarse control actuators 36 may include, but are not limited to including, hydraulic actuators, motors, or any other suitable device for receiving instructions to actuate a component of the machine 10, the implement 12, or any other component associated with the machine 10 which may affect motion of the implement 12. The plurality of coarse control actuators 36 may include one or more boom actuator(s) 37 for rotating, raising, lowering, and/or otherwise positioning the boom 24 relative to the housing 14 when said boom actuator(s) 37 are actuated. For controlling positioning of the stick 26 relative to the boom 24, the plurality of coarse control actuators 36 may include one or more stick actuator(s) 38, which may rotate, raise, lower, and/or otherwise position the stick upon actuation. The plurality of coarse control actuators 36 may further include implement actuator(s) 40 for controlling coarse positioning of the implement 12. Implement actuator(s) 40 may rotate, raise, lower, and/or otherwise position the implement 12 upon actuation.

To provide signals to the plurality of coarse control actuators 36 for actuation, the coarse control system 32 may include or be otherwise operatively associated with a controller 50. The controller 50 is operatively associated with the coarse control system 32 and its associated elements, which include, but are not limited to including, the coarse control actuators 36 and a coarse positioning system 52. The controller 50 may further be used to control the fine control system 34. As such, the controller 50 may be operatively associated with elements of the fine control system 34, including, but not limited to, fine actuators 54, a fine positioning system 56, and a relative positioning system 58.

The controller 50 may be used to control the implement 12 in a variety of autonomous, semi-autonomous, or manual modes. As used herein, an implement 12 of a machine 10 operating in an autonomous manner operates automatically based upon information received from various sensors without the need for human operator input. Further, an implement 12 of a machine 10 operating semi-autonomously may include an operator 60, either within the machine 10 or remotely, who performs some tasks or provides some input while other tasks are performed automatically based upon information received from various sensors. An implement 12 of a machine 10 being operated manually is one in which an operator 60 is controlling all or essentially all of the direction, speed and manipulating functions of the implement 12 of the machine 10. An implement 12 of a machine 10 may be operated remotely by an operator (e.g., a remote operation 62) in either a manual or semi-autonomous manner.

Operation of the implement 12, in any of the above referenced manners, may be executed by the controller 50. The controller 50 may be any electronic controller or computing system including a processor which operates to perform operations, execute control algorithms, store data, retrieve data, gather data, and/or any other computing or controlling task desired. The controller 50 may be a single controller or may include more than one controller disposed to control various functions and/or features of the implement 12 and the machine 10. Functionality of the controller 50 may be implemented in hardware and/or software and may rely on one or more data maps relating to the operation of the machine 10 and the implement 12. To that end, the controller 50 may include internal memory 64 and/or the controller 50 may be otherwise connected to external memory 66, such as a database or server. The internal memory 64 and/or external memory 66 may include, but are not limited to including, one or more of read only memory (ROM), random access memory (RAM), a portable memory, and the like. Such memory media are examples of nontransitory memory media.

User input 68 may be included with the control system 30 so that the operator 60 may have the ability to operate/control the implement 12 of the machine 10. For example, user input 68 may be provided within a cab 69 of the housing 14 of the machine 10, wherein the operator 60 may provide commands for the implement 12 when the machine 10 is operating in either a manual or semi-autonomous manner. The user input 68 may include one or more input devices through which the operator 60 may issue commands to control the implement 12 of the machine 10 by employing one or both of the coarse control system 32 and the fine control system 34 of the control system 30.

Additionally or alternatively, the control system 30 may include a wireless control link 70 which is connected to a wireless network. Via the wireless control link 70, commands may be given to the implement 12 via the controller 50 from a remote operation 62 (e.g., a command center, a foreman's station, and the like). Further, information may be accessed from and/or stored to the external memory 66 using the wireless control link 70. In certain embodiments, control of the implement 12 via the control system 30 may be distributed such that certain functions are performed at the machine 10 level (e.g., by the operator 60 utilizing the user input 68) and other functions are performed via remote operation 62.

Further, the control system 25 may be configured to implement a pre-determined implement control plan 74. The pre-determined implement control plan 74 may be instructions stored on at least one of the internal memory 64 and/or the external memory 66 and executed by the controller 50. The pre-determined implement control plan 74 may be influenced by elements of the control system 30, such as any input or feedback from the coarse positioning system 52, the fine positioning system 56, the relative positioning system 58, the user input 68, the remote operation 62, or any other conditions or controls associated with the implement 12 or the machine 10. The pre-determined implement control plan 74 may include one or more passes for a given task associated with the implement 12.

The pre-determined implement control plan 74 may be used by the controller 50 to determine implement control signals 75 for controlling the implement 12 and/or the machine 10, in accordance with the pre-determined implement control plan 74 and any other modifying factors, as discussed below. The implement control signals 75 may include one or both of coarse control signals 76 and fine control signals 78. The coarse control signals 76 may be transmitted from the controller 50 to the coarse control system 32 and, more specifically, may be transmitted to one or more of the coarse control actuators 36. The coarse control actuators 36, upon receiving the coarse control signals 76, may be actuated to execute coarse movements of the implement 12 in accordance with the pre-determined implement control plan 74 and any other modifying factors thereof. Similarly, the fine control signals 78 may be transmitted from the controller 50 to the fine control system 34 and, more specifically, may be transmitted to one or more of the fine actuators 54. Upon receiving the fine control signals 78, the fine actuators 54 may be actuated to perform fine movements of the implement 12 in accordance with the pre-determined implement control plan 74 and any other modifying factors thereof. "Fine movements" may be any movement of the implement 12 that has a range of motion that is less than the range of motion of the coarse movements.

In some examples, the pre-determined implement control plan 74 may include building-based or designing-based tool path instructions based on a digital model (e.g., a computer-aided drafting (CAD) model, a 3-D rendering, or any other digital model). Such path planning information and/or executable files are commonly known and used in various forms of additive construction and/or three-dimensional printing, wherein an object is formed by a machine based on a digital file, which provides a basis for control instructions to a machine or implement. For example, the pre-determined implement control plan 74 may execute instructions for additive construction using the machine 10 and the implement 12. Additive construction or manufacturing, also often referred to as three-dimensional printing, is a process of creating three-dimensional structures from a digital plan or design file. Such additive manufacturing plans and/or designs can be transformed into cross-sections and used to form successive layers to be laid by an additive manufacturing device. Any digital file that provides implement control instructions for path planning may be used as or as part of the pre-determined implement control plan 74, such as, but not limited to, a sterolithography (.stl) file format file, a Virtual Reality Modeling Language (VRML) format file, among other format files.

The pre-determined implement control plan 74 may include such digital plans and/or design files. In such examples, the implement 12 may be an additive construction device (e.g., an extruder) for laying down successive layers of material to construct a structure 79. In such a pre-determined implement control plan 74, instructions may include tool path instructions for the implement 12 that are generated based on a digital, three-dimensional model. The instructions may include successive layers of material to be laid until construction of the structure 79, to be manufactured, is completed. In such applications, precise control of the implement 12, using the control system 30, is required to properly and accurately lay the successive layers to construct the desired structure.

Figure 3:
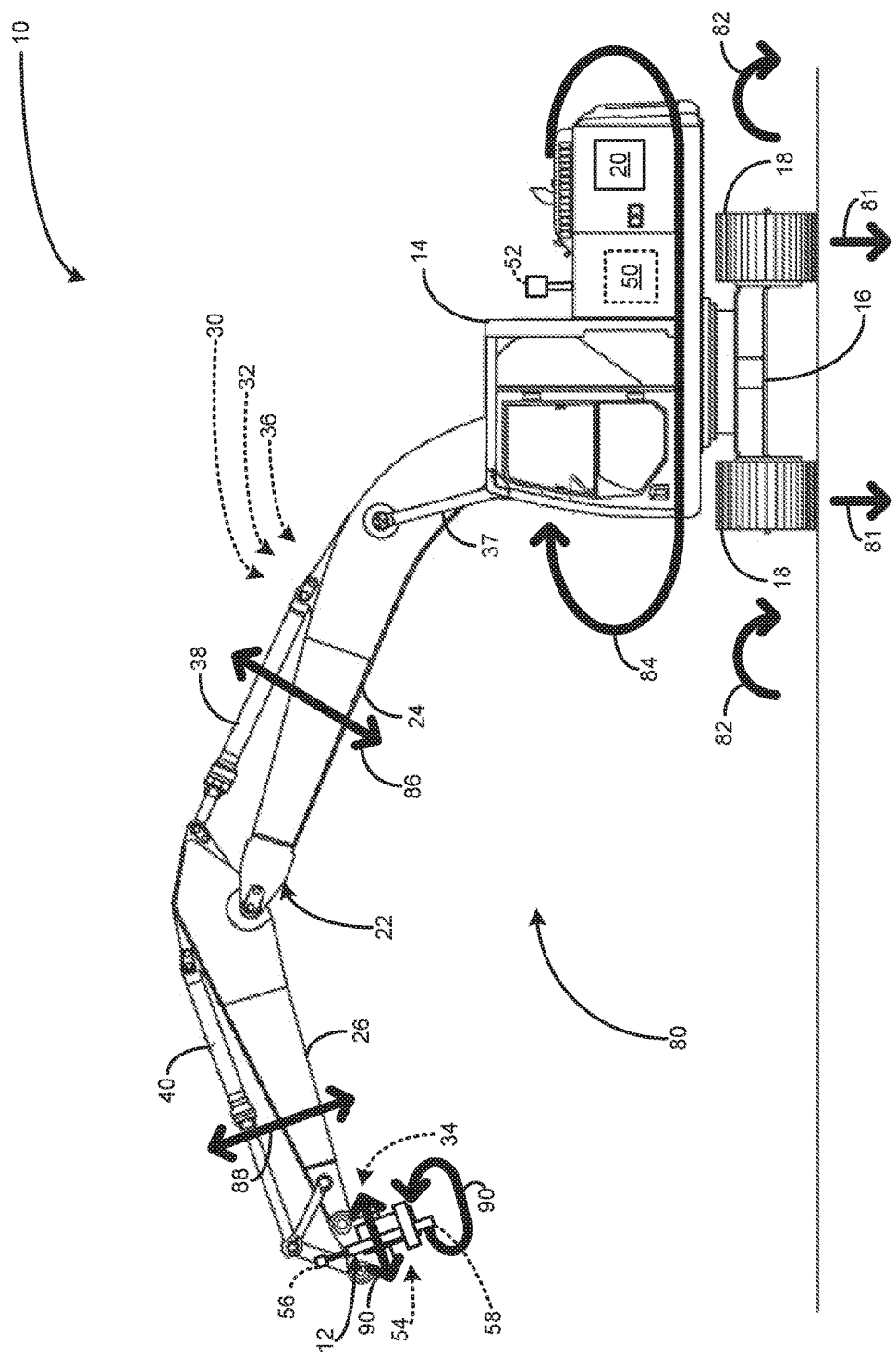
FIG. 3 is another side view of the example implement and machine of FIG. 1, but depicted showing functional characteristics of a coarse control system associated with the control system depicted in FIGS. 1 and 2.

As mentioned above, the control system 30 includes the coarse control system 32, whose functions are further illustrated in FIG. 3 and described herein. In generating, implementing, optimizing, or otherwise affecting desired controls for the coarse control system 32, the controller 50 may receive and utilize information provided by the coarse positioning system 52. In view of such desired controls, the coarse control system 32 controls coarse movement of the implement 12. For example, the coarse control system 32 may control movement of an implement in a range of motion that includes any motion plus or minus three inches along a desired path of movement instructed by the controller 50. However, this example is merely exemplary, and coarse movement controlled by the coarse control system 32 may be any range of motion which is greater than a range of motion of the fine control system 34.

In the non-limiting example of such a coarse control system 32 and the non-limiting example motion instructions 80 shown in FIG. 3, the coarse control system 32 may control the initial placement of the machine 10 by transmitting propulsion instructions to the ground engaging member(s) 18 and/or transmitting rotation instructions 82 for the ground engaging members to one or both of the ground engaging member(s) 18 and the undercarriage 16. Additional actuators (not shown) for positioning the ground engaging member(s) 18 and the undercarriage 16 may also be included. The coarse control system 32 may further provide control of the rotational position of the housing 14 via transmitting housing rotation instructions 84, which may be received by the housing 14, the undercarriage 16, and/or any other actuator or further movement device associated with the coarse control system 32. The housing rotation instructions 84 may set a gross position for the crane 22.

The crane 22 may be further controlled by boom height instructions 86 transmitted to boom actuator(s) 37. The boom height instructions 86 may raise or lower the boom 24 in accordance with the desired path of motion for the implement 12. The implement 12 may be further raised or lowered upon actuation of arm actuator(s) 38 based on arm height instructions, which may be transmitted to the arm actuator(s) 38 by the controller 50. Further, the implement 12 may be further raised, lowered, or otherwise positioned via coarse implement instructions 90, which may be transmitted to and executed by the implement actuator(s) 40.

Figure 4:
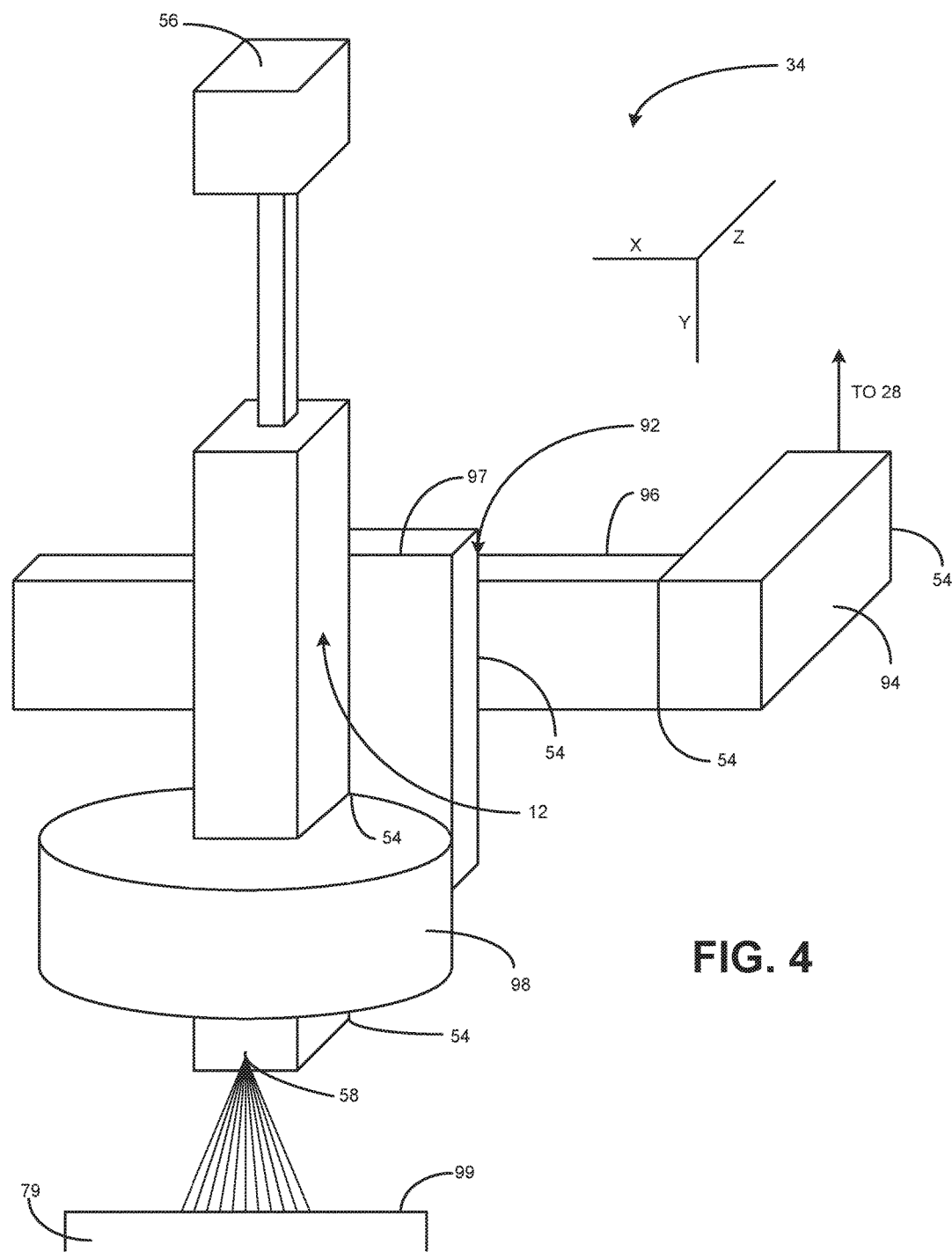
FIG. 4 is a three-dimensional perspective view of a fine control system associated with the control system of FIG. 1 and depicted in a magnified fashion.

The implement 12 may be further positioned, moved, rotated, or otherwise controlled by the fine control system 34. The fine control system 34 may be used to execute fine movements necessary for positioning the implement 12. The "fine movements" executed by the fine control system 34 may be any movement within any range of motion that is less than the range of motion of the coarse control system 32. For example, the fine control system 34 may control movement of an implement 12 in a range of motion that includes any motion plus or minus two millimeters along a desired path of movement instructed by the controller 50. The fine control system 34 is shown in a three-dimensional perspective view in FIG. 4. References to axes and planes, on which the depiction of the fine control system 34 is disposed, are made in view of the depicted "X," "Y," and "Z" axes.

To control fine movement of the implement 12, the fine control system 34 may include a fine control structure 92, which may be positioned in response to actuation one or more of the fine actuators 54. The fine control structure 92 is operatively associated with the implement 12, but in some examples the fine control structure 92 may be considered a component of the implement 12 itself, while still controlled by the fine control system 34. Alternatively, the fine control structure 92 may be a structure independent of the implement 12, wherein the implement is operatively associated with the fine control structure 92. The fine control structure 92 may further be attached, mounted to, or otherwise operatively associated with the stick 26 of the crane 22 at, for example, the distal end 28 of the stick 26. The fine actuators 54 may be located at and operatively connected to any location on the fine control structure 92 where the fine actuators 54 may be useful for positioning the implement 12. For example, and as shown, the fine actuators 54 may be located at connective points of positioning components of the fine control structure 92. Further, the fine actuators 54 may include, but are not limited to including, hydraulic actuators, motors, or any other suitable device for receiving instructions to position the implement 12 via, for example, the fine control structure 92.

The fine control structure 92 may be comprised of one or more associated components which pivot and/or otherwise move about any of the x, y, and/or z-axes to position the implement 12. Movement of elements of the fine control structure 92 may result from actuation of one or more of the fine actuators 54 in response to the fine control signals 78. In the non-limiting example of FIG. 4, the fine control structure 92 includes a first leg 94 that may connect to the distal end 28 of the stick 26 and shown extending along the z-axis, a second leg 96 that may pivotally connect to the first leg 94 and shown extending along the x-axis, a first mount 97 that may be connected to the second leg 96 and on which the implement 12 may be mounted, and a second mount 98 that may be connected to one or both of the implement 12 and the first mount 97 and may be able to rotate the implement 12. When actuated using one or more of the fine actuators 54, the first leg 94 may rotate, raise, lower, or otherwise move the implement 12 with respect to the positioning of the stick 26, as it may be connected to the distal end 28 of the stick 26. The second leg 96 may be pivotally connected to the first leg 94 and may rotate, raise, lower, or otherwise move the implement 12 with respect to the positioning of the first leg 94, when actuated by the fine actuators 54. The first mount 97 may be attached or otherwise operatively associated with the second leg 96 and may allow provide connection between the second leg 96 and the implement 12, such that it allows the implement 12 to move with the motion of the second leg 96, when moved by actuation of the fine actuators 54. In some examples, the first mount 97 may be movable with respect to the plane on which the second leg 96 is disposed. For example, the first mount 97 may be mounted to the second leg 96 via a track mount that allows the first mount 97 to move along the length of the second leg 96. Additionally, the second mount 98 may be used to further rotate the implement 12 along any plane on which the implement 12 is already positioned by upstream elements of the fine control system 34.

Feedback for determining both coarse controls and fine controls for a control scheme (e.g., the implement control plan 74) may be provided by the coarse positioning system 52, the fine positioning system 56, and/or the relative positioning system 58. The positioning systems 52, 56 may be employed to determine absolute positioning of the implement 12 and/or the machine 10 relative to a worksite. The positioning systems 52, 56 may include one or more GPS sensors for detecting locations of the machine 10 or one or more elements of the machine 10 relative to the worksite. Other elements of the positioning systems 52, 56 may include, but are not limited to including, perception based system sensors, and laser position detection systems, total station receivers, ranging radios, single or dual Global Navigation Satellite System (GNSS) receivers, and the like. All elements of the positioning systems 52, 56 may be used to determine the real time actual positioning of the implement 12 and/or the machine 10. Of course, other elements aiding in detecting positioning of implement 12 and/or the machine 10 or the worksite may be included and input from other sensors or receivers may also be used in determining the positioning of the implement 12 and/or the machine 10.

For relative position sensing, the relative positioning system 58 provides further feedback to the controller 50, which may be used for forming or influencing control instructions (e.g., the implement control plan 74) and/or altering existing control instructions. The relative positioning system 58 may include one or more perception sensors for determining positioning relative to a past operation of the machine. For example, the relative positioning system may include one or more cameras, LiDAR system, or any other perception sensing device. LiDAR is a radar-like remote sensing technology that measures distance by illuminating a target with a laser and analyzing the reflected light (the term LiDAR is a portmanteau of "light" and "radar"). The relative positioning system 58 may generate images to be processed by the controller 50 and used to determine future positioning for the implement 12. In the example shown in FIG. 4, the relative positioning system may be used to detect an edge 99 of the structure 79.

The ability of the relative positioning system 58 to determine relative position of the implement for use in future position may be useful when the pre-determined implement control plan 74 requires multiple passes to perform a task. Returning to the aforementioned, non-limiting example, where the implement 12 is an additive construction device, the controller 50 74 may determine where the implement 12 should be positioned, in accordance with the pre-determined implement control plan 74, when executing the next pass for adding a next layer to the structure 79. Feedback from the relative positioning system 58 may be utilized by the controller 50 to provide instructions to align the implement on top of the last pass, because the signals provided by the relative positioning system 58 from the previous pass can detect the edge 99 of the materials of the structure 79 laid in the previous pass.

Accordingly, relative positioning signals 59, determined by the relative positioning system, may be utilized by the controller 50 for operation resume functions during control of the implement 12, based on, at least, the pre-determined implement control plan 74. During the course of executing the pre-determined implement control plan 74, operations in accordance with the pre-determined implement control plan 74 may be interrupted, paused, halted, or otherwise stopped during operations. In such scenarios, it may be desired for operations of the machine 10 and/or implement 12 to be resumed, to continue operations beyond the past operation, which was interrupted, paused, halted, or otherwise stopped during operations. Using, at least, the relative positioning signals 59, the controller 50 may then determine a resume position for the implement 12, to resume operations for a resumed or "next" operation of the machine 10 and/or implement 12, in accordance with the pre-determined implement control plan 74.

Figure 5:
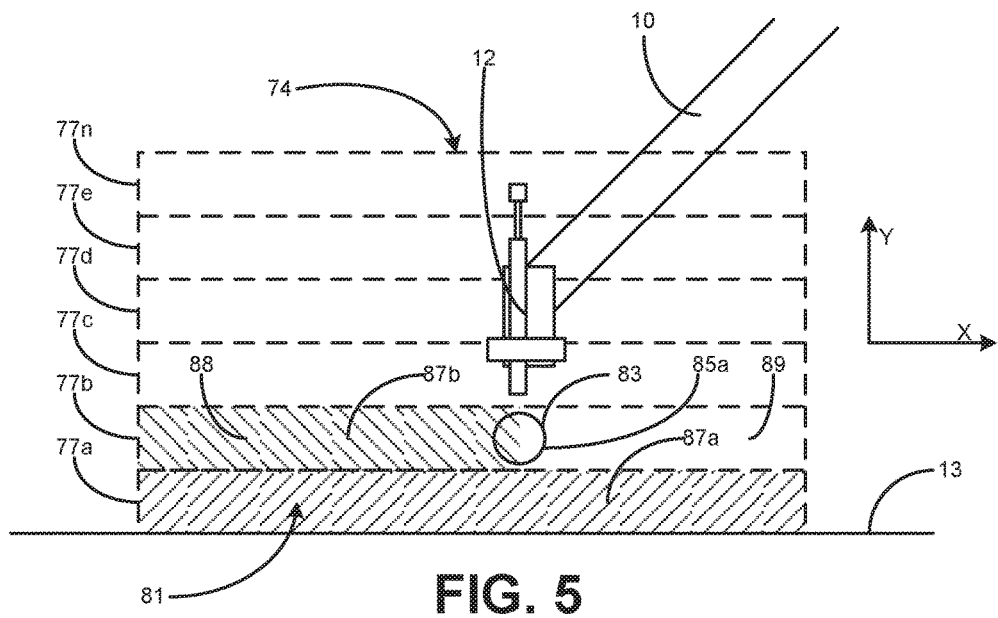
FIG. 5 is a two-dimensional side view of a worksite, denoting characteristics of a predetermined implement control plan (dashed lines), to be executed by the control system of FIGS. 1-4, and illustrating a completed portion of the implement control plan (hatched spaces), in accordance with the present disclosure.
Figure 6:
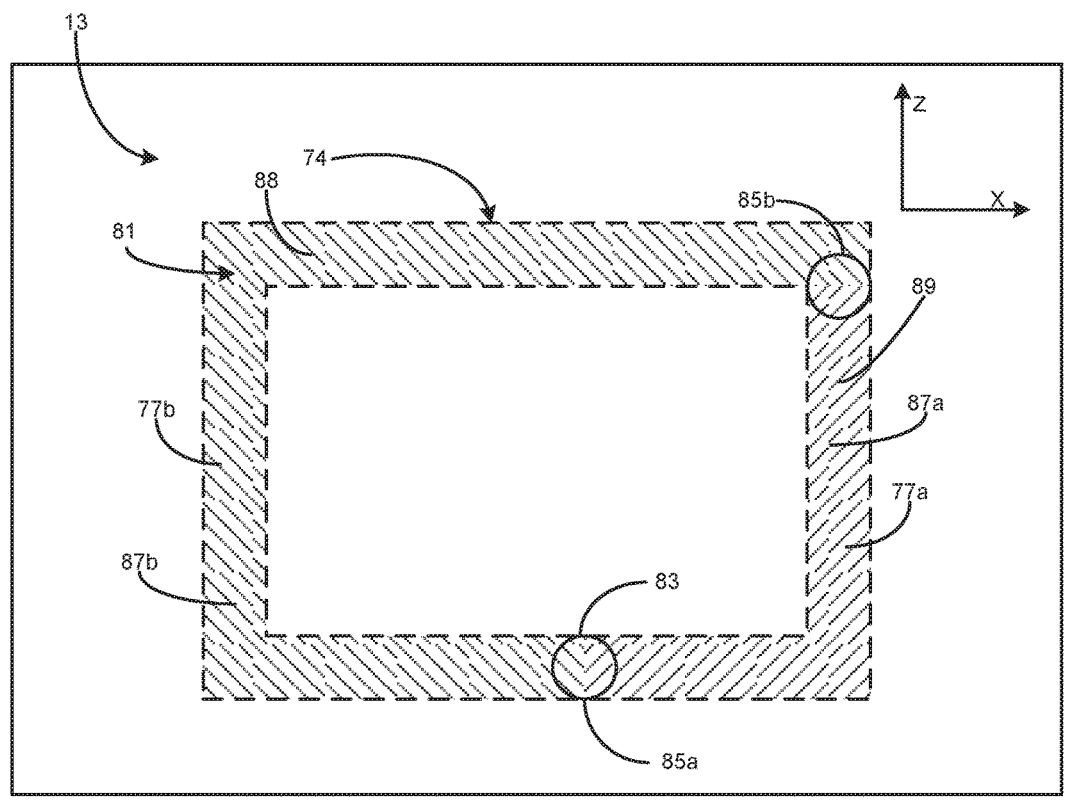
FIG. 6 is a two dimensional top view of the worksite of FIG. 5, denoting characteristics of the predetermined implement control plan (dashed lines), to be executed by the control system of FIGS. 1-4, and illustrating the completed portion of the implement control plan (hatched spaces), in accordance with FIG. 5 and the present disclosure.

To illustrate the pre-determined implement control plan 74 and an operation resume function's characteristics with respect to the pre-determined implement control plan 74, FIGS. 5 and 6 are provided. A visual depiction of path planning for controlling the implement 12 representative of the pre-determined implement control plan 74 (e.g., path plans for forming the structure 79) is depicted in FIGS. 5 and 6, with dashed lines. The pre-determined implement control plan 74 is shown superimposed upon a worksite 13.

Using the relative positioning signals 59, the controller 50 may determine current progress of the pre-determined implement control plan 74, relative to an actual implement operation 81 (denoted in FIGS. 5 and 6 by hashed markings), which has been performed by the implement 12. The actual implement operation 81 may have been completed, at least in part, during the past operation of the implement 12. In examples wherein the implement 12 is an additive construction implement and as shown in FIGS. 5 and 6, the actual implement operation may be an impartial structure formed in accordance with part performance of the pre-determined implement control plan 74.

Based on the relative positioning signals 59 and, optionally, a comparison of the relative positioning signals 59 with the pre-determined implement control plan 74, the controller 50 may further determine an end position 83 of the past operation of the implement 12 (e.g., an end position of the actual implement operation 81). The end position 83 may be indicative of a location in which the implement 12 discontinued operation, permanently or temporarily, when executing operations based on the pre-determined implement control plan 74.

While the past operation of the implement 12 may be halted or otherwise stopped, at least temporarily, the controller 50 may be configured to intelligently determine a location on the worksite 13 with which to resume operations of the implement 12, in accordance with the pre-determined implement control operation. Accordingly, the controller 50 may be configured to determine a resume position 85 for a next operation of the implement 12 based on the pre-determined implement control plan 74 and at least one of the relative positioning signals 59 and the end position 83. Utilizing the relative positioning signals 59, the controller 50 may determine an ideal resume position 85 based on, at least, terrain of the worksite 13 and any structures thereon. Additionally or alternatively, the controller 50 may utilize the end position 83 to determine the resume position 85, by determining if the end position 83 would be an ideal resume position 85*a* or if current conditions and/or environmental concerns would dictate that a different position, resume position 85*b*, which is not in close proximity of the end position 83, is ideal for the resume position 85. Further, the resume position 85 may be determined using any additional data or conditions determined by the controller 50 and/or any components of the control system 30, such additional data indicative of conditions affecting completion of the pre-determined implement control plan 74.

When utilizing a resume operation for the implement 12, being controlled in accordance with the pre-determined implement control plan 74, the controller 50 may then determine the implement control signals 75 based on, at least, the resume position 85. The implement control signals 75 may then be communicated to one or more actuators associated with the implement 12 and/or machine 10 (e.g., the fine actuators 54 and/or the coarse actuators 36, as discussed in more detail above), which may then position the implement 12 based on the implement control signals 75. Accordingly, by positioning the implement 12 based on the implement control signals 75 determined, as described, the actuators may position the implement 12 in accordance with the resume position 85, within the context of the pre-determined implement control plan 74.

As shown, the pre-determined implement control plan 74 may include a plurality of sub-routines 77, which may be performed as part of the pre-determined implement control plan 74. Each of the plurality of sub-routines 77 may be arranged in an iterative sequence which, when all of the plurality of sub-routines 77 are completed, results in completion of the pre-determined implement control plan 74. For example, in scenarios in which the implement 12 is an additive construction implement, the sub-routines 77 may each be associated with construction of a cross sectional row of the to-be-formed structure 79, which is formed upon completion of the pre-determined implement control plan 74. Of course, in examples wherein the pre-determined implement control plan 74 includes a plurality of sub-routines 77, the pre-determined implement control plan 74 may include any number of sequential sub-routines 77, including two or more of a first sub-routine 77*a*, a second sub-routine 77*b*, and any additional number of sub-routines 77 up to and including an nth sub-routine 77*n*.

As shown in FIGS. 5 and 6, the past operation 81 includes a completed sub-routine 87*a*, corresponding with the first sub-routine 77*a* and denoted by back slash hatching, and an incomplete sub-routine 87*b*, corresponding with the second sub-routine 77*b* and denoted by forward slash hatching. The incomplete sub-routine 87*b* includes a completed portion 88, of the second sub-routine 77*b*, and an incomplete portion 89, of the second sub-routine 77*b*. In such examples, determining the resume position 85, by the controller 50, may include determining a position within the incomplete portion 89 of the incomplete sub-routine 87*b*, upon which the resume position 85 will lie. In some examples, the resume position 85*a* may lie proximate to the end position 83. In some other examples, the resume position 85*b* may lie somewhere within the incomplete portion 89 that is not in close proximity to the end position 83.

In the examples in which the implement 12 is an additive construction implement, the completed portion 88 may be a portion of the planned second sub-routine 77*b*, in which the implement 12 has additively constructed a portion of a cross-sectional row, corresponding with the second sub-routine 77*b*, of the structure 79 and the incomplete portion 89 may be space in which the sub-routine 77*b* intends to additively construct a portion of the cross-sectional row, corresponding with the second sub-routine 77*b*, of the structure 79.

Figure 7:
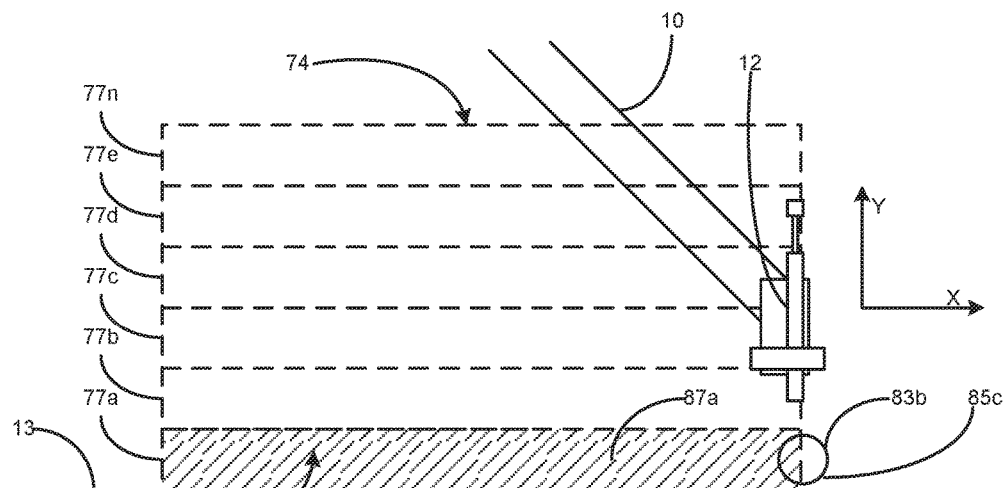
FIG. 7 is another two-dimensional side view of a worksite, denoting characteristics of a predetermined implement control plan (dashed lines), to be executed by the control system of FIGS. 1-4, and illustrating a completed portion of the implement control plan (hatched spaces), in accordance with the present disclosure.
Figure 8:
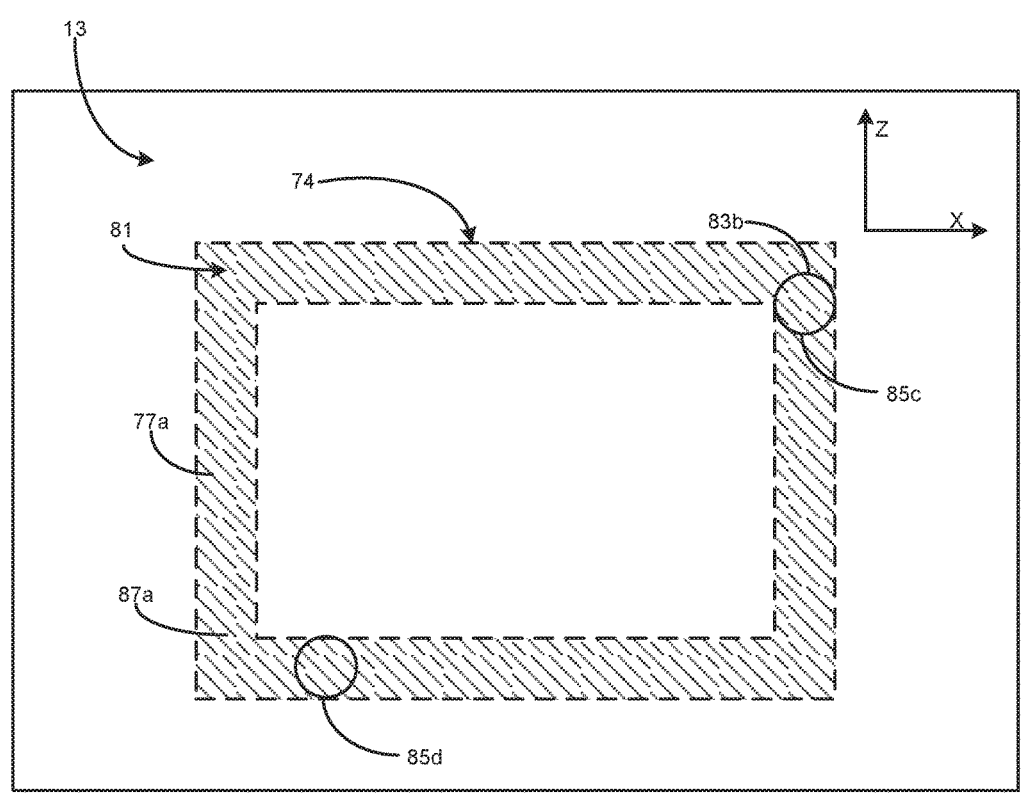
FIG. 8 is a two dimensional top view of the worksite of FIG. 7, denoting characteristics of the predetermined implement control plan (dashed lines), to be executed by the control system of FIGS. 1-4, and illustrating the completed portion of the implement control plan (hatched spaces), in accordance with FIG. 7 and the present disclosure.

Turning now to FIGS. 7 and 8, wherein like reference numerals are used for identical or similar elements of FIGS. 5 and 6, the actual implement operation 81, which may be a past operation of the implement 12, includes a completed sub-routine 87*a*, corresponding with the first sub-routine 77*a*. In such examples, the second sub-routine 77*b* is planned, by the pre-determined implement control plan 74, to be performed after the first sub-routine 77*a* is completed. In the present example, the first sub-routine 77*a* is completed, as the completed sub-routine 87*a*, and, therefore, the second sub-routine 77*b* is to be performed as a next operation of the implement 12. In such examples, the end position 83b is the position in which the implement 12 lied when the first sub-routine 77a was complete. Further, in such examples, determining the resume position 85, by the controller 50, includes determining a position within the planned space of the second sub-routine 77b, upon which the resume position 85 will lie. Examples of resume positions 85 that may be determined by the controller 50, in such examples, may include resume position 85c, which lies proximate to the end position 83, wherein the past operation ended, and any resume position 85d, which is not located in close proximity to the end position 83.

In the examples in which the implement 12 is an additive construction implement, the completed sub-routine 87a may be a portion of the pre-determined implement control plan 74, in which the implement 12 has additively constructed a cross-sectional row, corresponding with the first sub-routine 77a, of the structure 79 and the second sub-routine 77b may intend to additively construct another cross-sectional row, or a portion thereof, corresponding with the second sub-routine 77b, of the structure 79.

Figure 9:
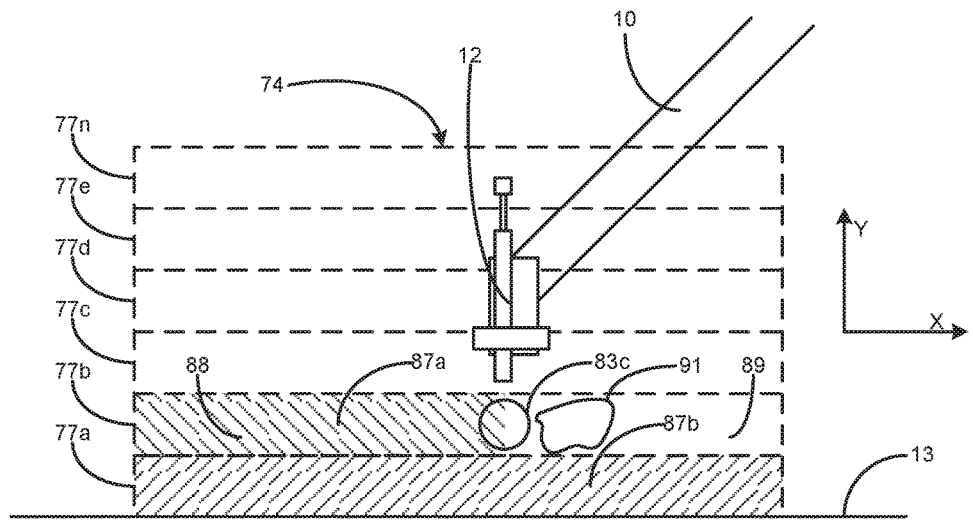
FIG. 9 is yet another two-dimensional side view of a worksite, denoting characteristics of a predetermined implement control plan (dashed lines), to be executed by the control system of FIGS. 1-4, illustrating a completed portion of the implement control plan (hatched spaces), and wherein a foreign object is present on the worksite, in accordance with the present disclosure.
Figure 10:
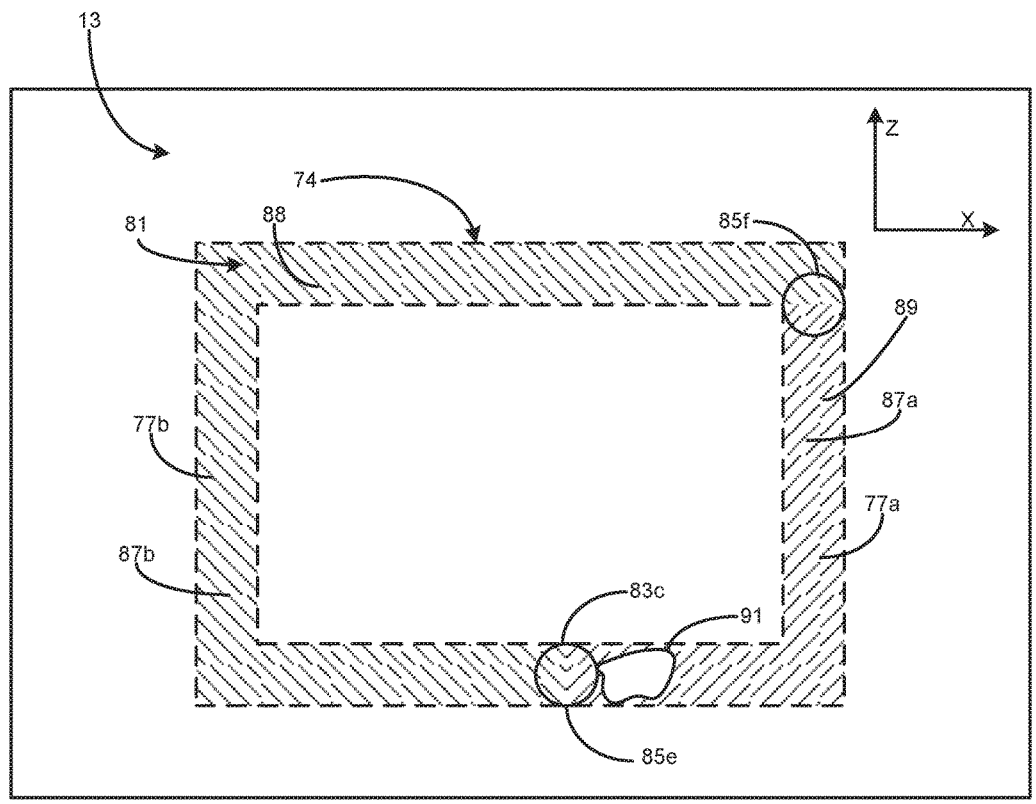
FIG. 10 is a two dimensional top view of the worksite of FIG. 9, denoting characteristics of the predetermined implement control plan (dashed lines), to be executed by the control system of FIGS. 1-4, illustrating the completed portion of the implement control plan (hatched spaces), and wherein the foreign object is present on the worksite in accordance with FIG. 9 and the present disclosure.

FIGS. 9 and 10, which include like reference numerals that are used to identify identical or similar elements to those of FIGS. 5-8, illustrate a scenario in which the controller 50 is capable of detecting a foreign object 91 on the worksite 13, based on the relative positioning signals 59. The foreign object 91 may be any object on the worksite 13 that is not planned to be on the worksite 13, in accordance with the pre-determined implement control plan 74. For example, the foreign object 91 may be any environmental objects (greenery, wood, rocks, ice, sand, etc.), any machines or machine components, or any other tangible object not intended to be located on the worksite 13 during operation of the implement 12 in accordance with the pre-determined implement control plan 74.

In such examples, the controller 50 may be configured to determine existence of the foreign object 91 based on the relative positioning signals 59. If the controller 50 determines that the foreign object 91 exists on the worksite 13, then the controller 50 determines positioning of the foreign object 91 on the worksite 13. In such examples, determining the resume position 85 may be further based on the positioning of the foreign object 91. In such examples, it may be advantageous to plan the resume position 85 away from the foreign object 91, such that the foreign object 91 may be removed prior to implement 12 operations at the location of the foreign object 91. Regardless, examples of resume positions 85 that may be determined by the controller 50, in such examples, may include resume position 85e, which lies proximate to the end position 83, wherein the past operation ended, and any resume position 85f, which is not located in close proximity to the end position 83.

In examples wherein the implement 12 is an additive construction implement, it may be particularly advantageous to plan the resume position 85 away from the foreign object 91, so that the foreign object 91 does not get caught within additive construction materials extruded thereon.

INDUSTRIAL APPLICABILITY

The present disclosure generally relates to control systems for machines and, more particularly, to operation resume functions implemented within control systems and methods for machines and associated implements, which utilize relative positioning. As shown above, the control system 30 may be employed for control of an excavator; however, the systems and methods of the present disclosure may be applied to any work machines performing a task such as, but not limited to, additive construction, loading, compacting, lifting, brushing, and the like. Further, such machines may include one or more implements to be controlled by the present disclosure's systems and methods, such implements may include, but are not limited to including, additive construction implements, buckets compactors, forked lifting devices, brushes, grapples, cutters, shears, blades, breakers, hammers, augers, and the like.

Figure 11:
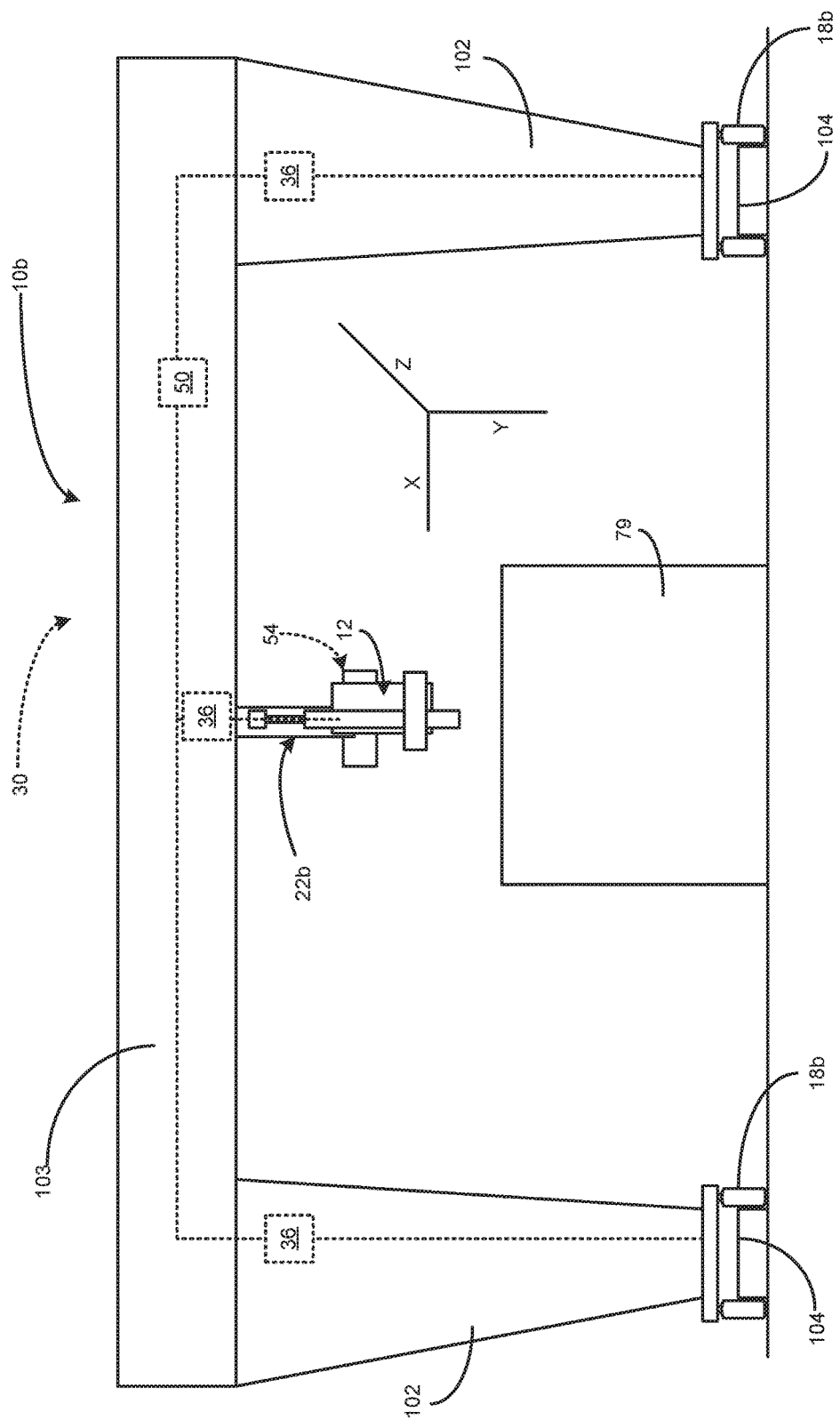
FIG. 11 is a side view of another example machine, with which the implements and control systems illustrated and described, with reference to FIGS. 1-10, may also be utilized, in accordance with an embodiment of the present disclosure.
Figure 12:
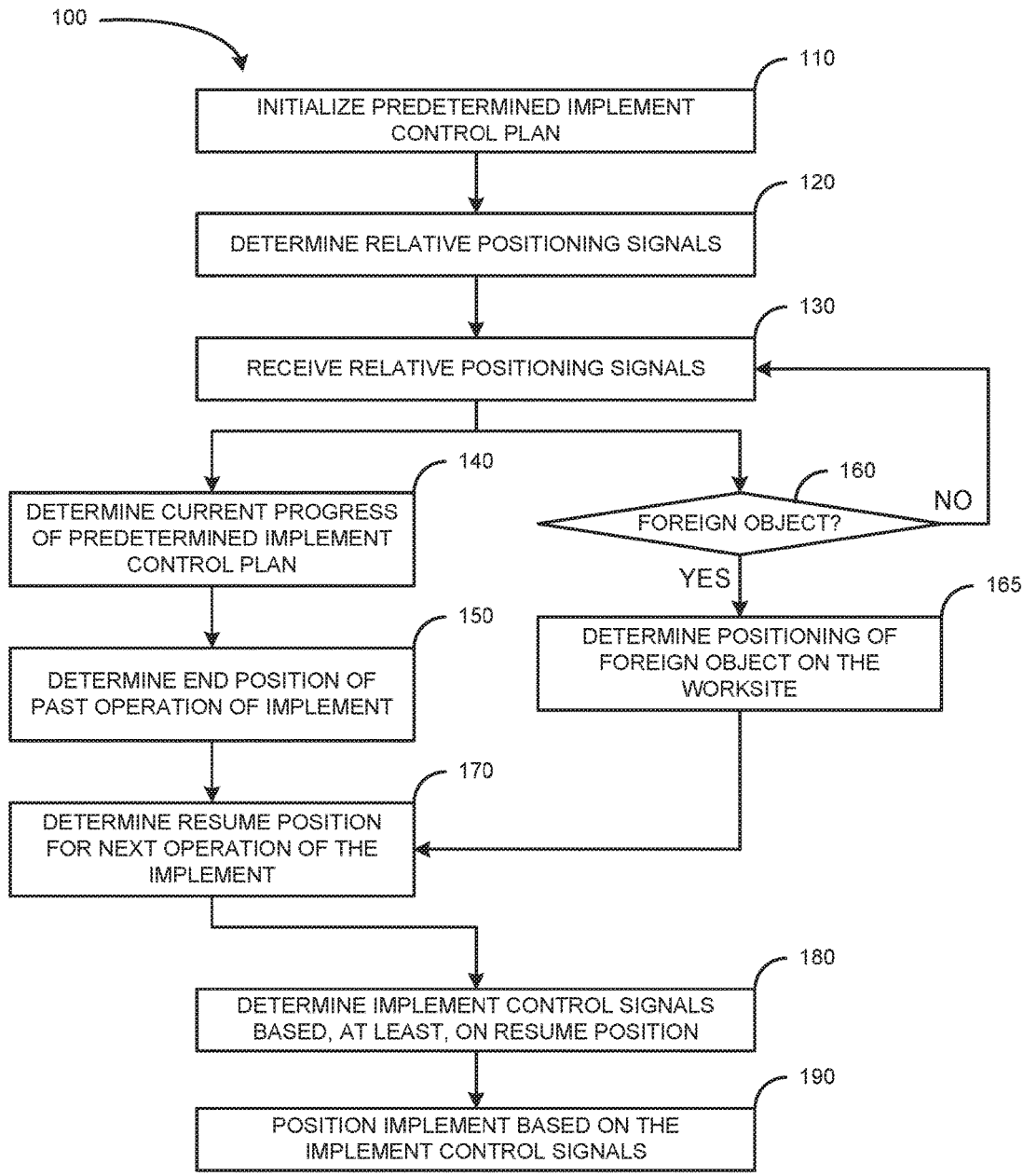
FIG. 12 is a flow chart representative of a method for controlling an implement of a machine, in accordance with the present disclosure.

As mentioned, the control system 30 for the implement 12, and any other control systems or methods disclosed herein, are not limited to use with the machine 10 shown in FIGS. 1-4 and discussed above. For example, as shown in FIG. 11, the control system 30 may be utilized to control an alternative machine 10b, in accordance with the systems and methods disclosed herein. The machine 10b depicted in FIG. 11 is a gantry-type machine utilized to control the implement 12, when performing functions in accordance with a pre-determined implement control plan, such as the pre-determined implement control plan 74. The machine 10b may include two or more legs 102 positioned, generally, perpendicular with respect to the direction of gravity, which, as depicted, means the legs 102 extend in the "Y" coordinate direction along a Y axis. The legs 102 may each be attached to or operatively associated with ground engaging devices 18b, which may move the machine 10b with respect to the worksite and, in turn, position the implement 12 during or after motion of the machine 10b. In some examples, movement of the machine 10b, via the ground engaging devices 18b, may be constrained or guided by tracks 104, around which the ground engaging devices 18b are positioned and propel along. The ground engaging devices 18b, whether guided by the tracks 104 or not, may move the machine 10b and, in turn, the implement 12 along a Z-axis, as shown.

The machine 10b may further include a horizontal scaffold 103 positioned substantially perpendicular to the legs 102, which is also attached to or otherwise operatively connected to the legs 104, thereby moving with the legs 102 in response to propulsion from the ground engaging device(s) 18b. The horizontal scaffold 103 may be operatively associated with a gantry crane 22b, which may move the implement 12 along an X-axis, with respect to the horizontal scaffold 103. For example, the gantry crane 22b may be connected to the horizontal scaffold 22b via a track (not shown) and may be positioned upon the track, along the X-axis, with respect to the horizontal scaffold 103, by being positioned by one or more of the coarse actuators 36. Further, the gantry crane 22b may position the implement 12 along the Y axis via extension of the gantry crane 22b, retraction of the gantry crane 22b, or other positioning of the gantry crane 22b by another object or coarse actuator 36, relative to the horizontal scaffolding 103.

Accordingly, the control system 30 may control positioning of the implement 12, in accordance with the pre-determined implement control plan 74 by utilizing the machine 10b. In doing so, the control system 30 may utilize the coarse actuators 36 to perform coarse movements of the machine 10b, in positioning the implement 12, while, similar to the machine 10, also utilizing the fine actuators 54 to finely position the implement 12, in accordance with the pre-determined implement control plan 74. In the examples wherein the implement 12 is an additive construction implement 12, the machine 10b may be utilized in conjunction with the control system 30, in accordance with the pre-determined implement control plan 74, to additively construct the structure 79, in accordance with the systems and methods disclosed herein. Of course, while the machines 10, 10b are illustrated herein, it is certainly contemplated that the systems and methods of the present disclosure may be applied to other types of machines and, certainly, the systems and methods of the present disclose are not limited to application in conjunction with the machines 10, 10b.

By utilizing relative positioning in such control systems, for any mentioned machines, the disclosed systems and methods may provide greater control accuracy for an implement of a machine, such as the implement 12 of the machine(s) 10, 10b. To that end, FIG. 11 illustrates a flowchart for an example method 100 for controlling an implement of a machine, which includes utilization of the relative positioning system 58 for determining operation resume during a pre-determined implement control plan. The method 100 is described, below, with reference to elements of the implement 12 and its associated control system 30, as described in detail above with reference to FIGS. 1-10. However, the method 100 is certainly not limited to application in conjunction with the implement 12 and associated control system 30 and the method 100 is capable of being performed on or using other implements and/or control systems.

The method 100 may begin at block 110, wherein the pre-determined implement control plan 74 is initialized by the controller 50. Concurrently or after the pre-determined implement control plan 74 is initialized, the method 100 may include determining the relative positioning signals 59, by the relative positioning system 58, as discussed in more detail above, as depicted by block 120. The controller 50 may then receive the relative positioning signals 59 from the relative positioning system 58, as depicted in block 130.

Based on the relative positioning signals 59, the controller 50 may determine current progress of the pre-determined implement control plan 74, relative to an actual implement operation performed by the implement 12, as depicted in block 140. Further, the method 100 may include determining an end position 83 of the past operation of the implement 12, based on one or more of the current progress, the relative positioning signals 59, and any combinations thereof, as depicted in block 150. Utilizing the pre-determined implement control plan 74 and one or more of the relative positioning signals 59, the current progress, the end position 83, and any combinations thereof, the method 100 may further include determining a resume position 85 for a next operation of the implement 12, as depicted in block 170.

In some examples, concurrent, before, or after blocks 140 and 150, the method 100 may further include determining, by the controller 50, whether or not a foreign object 91 exists on the worksite 13, based on the relative positioning signals 59, as depicted by the decision 160. In such examples, the method 100 may further include determining, by the controller 50, positioning of the foreign object 91 on the worksite 13, based on the relative positioning signals 59, if the foreign object 91 indeed exists on the worksite 13, as depicted in block 165. In such examples, determining the resume position 85, at block 170, may further be based on positioning of the foreign object 91.

Further, the method 180 may continue to block 180, wherein the controller 50 may determine the implement control signals 75 based on, at least, the resume position 85. Further, the method 100 may include positioning the implement 12 based on the implement control signals 75 using one or more actuators (e.g., the fine actuators 54 and/or the coarse actuators 36), as depicted in block 190.

While the disclosed systems and methods are useful in additive manufacturing applications, the disclosed systems and methods are certainly not limited to use in additive manufacturing applications.

It will be appreciated that the present disclosure provides fine control systems for implements of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for controlling operation of an implement based, at least, on a pre-determined implement control plan, the implement associated with a machine, the control system comprising:
   a relative positioning system including one or more perception sensors operatively associated with the implement and configured for determining positioning of the implement relative to a past operation of the implement, the past operation performed as part of the pre-determined implement control plan, the relative positioning system utilizing input from the perception sensors to determine relative positioning signals, the relative positioning signals representative of a position of the implement relative to a worksite;
   a controller configured to:
      determine current progress of the predetermined implement control plan, relative to an actual implement operation performed by the implement, based on the relative positioning signals;
      determine an end position of the past operation of the implement based on the relative positioning signals;
      determine a resume position for a next operation of the implement based on the predetermined implement control plan and at least one of the relative positioning signals and the end position;
      determine implement control signals based on, at least, the resume position; and
   one or more actuators, each of the one or more actuators operatively associated with one or both of the implement and machine, the one or more actuators configured to receive the implement control signals and position the implement based on the implement control signals.

2. The control system of claim 1, wherein the pre-determined implement control plan includes a plurality of sub-routines, each of the sub-routines being arranged in an iterative sequence which, when all of the plurality of sub routines are completed, results in completion of the pre-determined implement control plan.

3. The control system of claim 2, wherein the past operation includes an incomplete sub-routine of the plurality of sub-routines, the incomplete sub-routine including a completed portion and an incomplete portion, and
   wherein determining the resume position, by the controller, includes determining a position within the incomplete portion of the incomplete subroutine upon which the resume position lies.

4. The control system of claim 2, wherein the plurality of sub-routines includes, at least, a first sub-routine and a second sub-routine, the second sub-routine planned to be completed after the first sub-routine is completed,
   wherein the past operation is the first sub-routine, and
   wherein determining the resume position, by the controller, includes determining a position within the second sub-routine upon which the resume position lies.

5. The control system of claim 1, wherein the controller is further configured to:
  determine existence of a foreign object on the worksite, based on the relative positioning signals,
  determine positioning of the foreign object on the worksite, if the controller has determined existence of the foreign object, based on the relative positioning signals, and
  wherein determining the resume position, by the controller, is further based on positioning of the foreign object, if the controller has determined existence of the foreign object.

6. The control system of claim 1, wherein the implement control signals include coarse control signals and fine control signals,
  wherein the one or more actuators include one or more coarse actuators configured for receiving the coarse control signals from the controller, controlling coarse movements of the implement based on the coarse control signals, the coarse movements having a coarse range of motion, and positioning the implement using coarse movements based on the coarse control signals, and
  wherein the one or more actuators includes one or more fine actuators configured for receiving the fine control signals from the controller, controlling fine movements of the implement based on the fine control signals, the fine movements having a fine range of motion, the fine range of motion being less than the coarse range of motion, and positioning the implement using fine movements based on the fine control signals.

7. The control system of claim 6, further comprising a fine control structure, the fine control structure including one or more fine control components operatively associated with the implement, the one or more fine control components moved by the one or more fine control actuators to position the implement based on the fine control signals.

8. The control system of claim 6, wherein the machine further includes a housing and a crane and wherein the one or more coarse actuators position the implement by moving at least one of the housing and the crane based on the coarse control signals.

9. The control system of claim 8, wherein the crane includes a boom operatively connected to the housing and a stick operatively connected to the boom and the implement, and
  wherein the one or more coarse actuators position the implement by moving at least one of the boom relative to the housing, the stick relative to the boom, and the implement relative to the stick.

10. A method for controlling an implement of a machine based, at least, on a pre-determined implement control plan stored on a memory of a controller operatively associated with the machine and implement, the method comprising:
  determining, by a relative positioning system, relative positioning signals based on input of one or more perception sensors of the relative positioning system, the one or more perception sensors being operatively associated with the implement and configured for determining positioning of the implement relative to a past operation of the implement, the relative positioning signals representative of a position of the implement relative to a worksite;
  receiving, by the controller, the relative positioning signals from the relative positioning system;
  determining, by the controller, current progress of the predetermined implement control plan, relative to an actual implement operation performed by the implement, based on the relative positioning signals;
  determining, by the controller, an end position of the past operation of the implement based on one or more of the current progress, the relative positioning signals, and any combinations thereof;
  determining a resume position for a next operation of the implement based on the predetermined implement control plan and one or more of the relative positioning signals, the current progress, the end position, and any combinations thereof; and
  determining implement control signals based on, at least, the resume position.

11. The method of claim 10, further comprising positioning the implement, using one or more actuators, each of the one or more actuators associated with one or both of the implement and the machine, based on the implement control signals.

12. The method of claim 10, wherein the pre-determined implement control plan includes a plurality of sub-routines, each of the sub-routines being arranged in an iterative sequence which, when all of the plurality of sub-routines are completed, results in completion of the pre-determined implement control plan,
  wherein the past operation is an incomplete sub-routine of the plurality of sub-routines, the incomplete sub-routine including a completed portion and an incomplete portion, and
  wherein determining the resume position, by the controller, includes determining a position within the incomplete portion of the incomplete subroutine upon which the resume position lies.

13. The method of claim 10, wherein the pre-determined implement control plan includes a plurality of sub-routines, each of the sub-routines being arranged in an iterative sequence which, when all of the plurality of sub-routines are completed, results in completion of the pre-determined implement control plan,
  wherein the plurality of sub-routines includes, at least, a first sub-routine and a second sub-routine, the second sub-routine planned to be completed after the first sub-routine is completed,
  wherein the past operation is the first sub-routine, and
  wherein determining the resume position, by the controller, includes determining a position within the second sub-routine upon which the resume position lies.

14. The method of claim 10, further comprising:
  determining, by the controller, existence of a foreign object on the worksite, based on the relative positioning signals,
  determining, by the controller, positioning of the foreign object on the worksite, if the foreign object exists on the worksite, based on the relative positioning signals, and
  wherein determining the resume position, by the controller, is further based on positioning of the foreign object, if the controller has determined existence of the foreign object.

15. The method of claim 10, wherein the implement is an additive construction implement and the pre-determined implement control plan is part of an additive construction control plan for constructing a structure on the worksite, the pre-determined implement control plan including a plurality of sub-routines, each of the plurality of sub-routines associated with one of a plurality of planned layers of the structure, each of the plurality of sub-routines including instructions for directing the implement to additively form one of the plurality of planned layers of the structure.

16. A control system for controlling operation of an additive construction implement based, at least, on a pre-determined implement control plan of an additive construction control plan for constructing a structure on a worksite, the additive construction implement associated with a machine, the control system comprising:
- a relative positioning system including one or more perception sensors operatively associated with the additive construction implement and configured for determining positioning of the additive construction implement relative to a past operation of the additive construction implement, the past operation performed as part of the pre-determined implement control plan, the relative positioning system utilizing input from the perception sensors to determine relative positioning signals, the relative positioning signals representative of a position of the additive construction implement relative to a worksite;
- a controller configured to:
    - determine current progress of the predetermined implement control plan, relative to an actual additive construction implement operation performed by the additive construction implement, based on the relative positioning signals;
    - determine an end position of the past operation of the additive construction implement based on the relative positioning signals;
    - determine a resume position for a next operation of the additive construction implement based on the pre-determined implement control plan and at least one of the relative positioning signals and the end position;
    - determine additive construction implement control signals based on, at least, the resume position; and
- one or more actuators, each of the one or more actuators operatively associated with one or both of the additive construction implement and machine, the one or more actuators configured to receive the additive construction implement control signals and position the additive construction implement based on the additive construction implement control signals.

17. The system of claim 16, wherein the additive construction control plan includes a plurality of planned layers for construction of the structure,
- wherein the pre-determined implement control plan includes a plurality of sub-routines, each of the plurality of sub-routines associated with one of the plurality of planned layers of the structure and each of the plurality of sub-routines including instructions for directing the implement to additively form one of the plurality of planned layers of the structure, and
- wherein each of the sub-routines are arranged in an iterative sequence which, when all of the plurality of sub-routines are completed, results in completion of the pre-determined implement control plan.

18. The system of claim 17, wherein the past operation is an incomplete sub-routine of the plurality of sub-routines, the incomplete sub-routine including a completed portion and an incomplete portion, and
- wherein determining the resume position, by the controller, includes determining a position within the incomplete portion of the incomplete subroutine upon which the resume position lies.

19. The system of claim 17, wherein the plurality of sub-routines includes, at least, a first sub-routine and a second sub-routine, the second sub-routine planned to be completed after the first sub-routine is completed,
- wherein the past operation is the first sub-routine, and
- wherein determining the resume position, by the controller, includes determining a position within the second sub-routine upon which the resume position lies.

20. The system of claim 16, wherein the controller is further configured to:
- determine existence of a foreign object on the worksite, based on the relative positioning signals,
- determine positioning of the foreign object on the worksite, if the controller has determined existence of the foreign object, based on the relative positioning signals, and
- wherein determining the resume position, by the controller, is further based on positioning of the foreign object, if the controller has determined existence of the foreign object.

* * * * *